(12) United States Patent
Schröter et al.

(10) Patent No.: US 8,979,134 B2
(45) Date of Patent: Mar. 17, 2015

(54) JOINT UNIT AND JOINT ASSEMBLY COMPRISING SUCH A JOINT UNIT FOR NON-DETACHABLE CONNECTION OF MEDIA-CONVEYING LINES

(71) Applicant: Fränkische Industrial Pipes GmbH & Co. KG, Königsberg (DE)

(72) Inventors: Sören Schröter, Hallstadt (DE); Mario Willner, Reckertshausen (DE)

(73) Assignee: Frankische Industrial Pipes GmbH & Co. KG, Konigsberg (DE)

( * ) Notice: Subject to any disclaimer, the term of this patent is extended or adjusted under 35 U.S.C. 154(b) by 103 days.

(21) Appl. No.: 13/719,834

(22) Filed: Dec. 19, 2012

(65) Prior Publication Data

US 2013/0154256 A1  Jun. 20, 2013

(30) Foreign Application Priority Data

Dec. 20, 2011 (DE) .......................... 10 2011 089 100

(51) Int. Cl.
   *F16L 37/00* (2006.01)
   *F16L 37/084* (2006.01)

(52) U.S. Cl.
   CPC .................................... *F16L 37/084* (2013.01)
   USPC .......................................... 285/321; 285/305

(58) Field of Classification Search
   CPC ............................... F16L 37/088; F16L 37/098
   USPC .......................................... 285/321, 319, 305
   See application file for complete search history.

(56) References Cited

U.S. PATENT DOCUMENTS

| 4,126,335 | A | * | 11/1978 | Voss | 285/321 |
| 4,226,445 | A | * | 10/1980 | Kramer | 285/321 |
| 4,471,978 | A | * | 9/1984 | Kramer | 285/321 |
| 4,753,458 | A | * | 6/1988 | Case et al. | 285/319 |
| 4,850,622 | A | * | 7/1989 | Suzuki | 285/321 |
| 4,889,368 | A | * | 12/1989 | Laipply | 285/321 |
| 5,356,181 | A |   | 10/1994 | Shirogane et al. | |
| 5,374,088 | A |   | 12/1994 | Moretti et al. | |
| 5,568,946 | A | * | 10/1996 | Jackowski | 285/319 |

(Continued)

FOREIGN PATENT DOCUMENTS

DE     4334529     4/1994
DE    19722842    12/1998

(Continued)

OTHER PUBLICATIONS

German Patent Search Report dated Mar. 28, 2012 in German Patent Application No. DE 10 2011 089 100.5.

(Continued)

*Primary Examiner* — David E Bochna
(74) *Attorney, Agent, or Firm* — Plumsea Law Group, LLC

(57) ABSTRACT

A joint unit is provided, including a main body, a bush, which is fastened to the main body and forms with the main body a receiving space for a connecting piece, and a separately formed retaining unit arranged in a radially inwardly open circumferential groove in the bush. The radially inwardly open circumferential groove in the bush is open towards an axial end face of the bush in at least two circumferential portions. A connection assembly is further provided, including a joint unit and a connecting piece.

18 Claims, 4 Drawing Sheets

(56) References Cited

U.S. PATENT DOCUMENTS

| | | | |
|---|---|---|---|
| 5,873,610 A * | 2/1999 | Szabo | 285/319 |
| 5,924,746 A * | 7/1999 | Fixemer | 285/319 |
| 5,934,713 A | 8/1999 | Guest | |
| 6,318,764 B1 * | 11/2001 | Trede et al. | 285/305 |
| 6,517,120 B1 * | 2/2003 | Miyajima et al. | 285/305 |
| 8,157,296 B2 * | 4/2012 | Ullrich et al. | 285/321 |
| 2009/0256354 A1 * | 10/2009 | Ullrich et al. | 285/308 |
| 2011/0067225 A1 * | 3/2011 | Bassaco | 29/525.01 |
| 2013/0154258 A1 * | 6/2013 | Schroter et al. | 285/305 |

FOREIGN PATENT DOCUMENTS

| | | |
|---|---|---|
| DE | 102007039368 | 2/2009 |
| DE | 102009056336 | 6/2011 |
| EP | 0605801 | 7/1994 |

OTHER PUBLICATIONS

German Patent Search Report dated May 8, 2012 in German Patent Application No. DE 10 2011 089 099.8.

* cited by examiner

JOINT UNIT AND JOINT ASSEMBLY COMPRISING SUCH A JOINT UNIT FOR NON-DETACHABLE CONNECTION OF MEDIA-CONVEYING LINES

CROSS REFERENCE TO RELATED APPLICATION

This application is based upon and claims the benefit of priority from prior German Patent Application No. 10 2011 089 100.5, filed Dec. 20, 2011, the entire contents of which are incorporated herein by reference.

The invention relates to a joint unit comprising a main body, which is designed and intended to be connected with a connecting piece not forming part of the joint unit, a bush, which, when the joint unit is assembled, is fastened to the main body in the direction of a longitudinal axis of the joint unit and forms with the main body a receiving space open towards one end of the main body, which space is intended to receive the connecting piece, and a retaining unit formed separately from the bush, which is arranged in a circumferential groove in the bush open radially inwards relative to the longitudinal axis, the retaining unit comprising a bearing surface directed in the opening direction of the receiving space, which is intended to interact with a mating bearing surface of the bush directed opposite to the opening direction, and the retaining unit further comprising a further bearing surface directed opposite to the opening direction, which is intended to interact with a further mating bearing surface of the connecting piece directed in the opening direction.

It should be pointed out at this point that the indications "in the axial direction" and "in the radial direction" always relate to the longitudinal axis of the joint unit. As far as the "opening direction" of the receiving space is concerned, it should be pointed out that this extends in the opposite direction to the "insertion direction" of the connecting piece into the receiving space. In addition, the indication "fastened in the axial direction" means merely that the part in question cannot be withdrawn from the main body in the opening direction of the receiving space, but not necessarily that the two parts are fastened completely rigidly together in the axial direction.

Recently, there has been a greater requirement for the use of non-detachable connection assemblies, so as to be able to prevent undesired disassembly or attempts to manipulate the connection assemblies. This requirement is found in particular in the field of low-emission vehicles, and comes for example from the CARB approvals body (CARB—California Air Resources Board) for use in cars and motorcycles.

Such non-detachable connection assemblies and joint units are known per se. At least some of the components thereof, in particular the bush and/or the retaining unit, are preferably manufactured as plastics injection mouldings. However, they all have the disadvantage that the bush in particular is complex to injection mould and the retention force responsible for non-detachability cannot be reproduced with the desired precision.

"Collapsible cores", as known for example from DE 10 2007 039 368 A1, are conventionally used to form the radially inwardly open circumferential groove in the bush for receiving the retaining unit. These collapsible cores conventionally have a central body, on which at least three main segments and at least three intermediate segments are mounted displaceably by means of dovetail guides extending at an angle to the longitudinal axis of the central body. The main segments extend over a greater circumferential angle than the intermediate segments. The angle of inclination of their guides is on the other hand less than that of the intermediate segment guides. Manufacturers suggest that in principle diameters of as little as 10 mm are possible. Due to the structure explained above, it is easy to see, however, that collapsible cores of such small diameters are not only difficult to produce and thus inevitably associated with high production costs, but are also extremely susceptible to failure in operation.

It is therefore an object of the invention to develop further the design of the joint unit of the above-mentioned type such that it is simpler to manufacture, preferably with low susceptibility to failure in operation, preferably even with small internal bush diameters, i.e. with internal diameters of 15 mm and less.

Said object is achieved according to the invention by a joint unit of the above-mentioned type, in which the radially inwardly open circumferential groove in the bush is open in at least two circumferential portions towards an axial end face of the bush, preferably down to the base of the groove. This measure makes it possible to use a collapsible core to produce the joint unit according to the invention which has only main segments mounted displaceably relative to a central body, while the intermediate segments are rigidly connected to the central body, preferably are constructed in one piece therewith. The moulding effected by the rigid intermediate segments in the injection-moulded plastics corresponds to the circumferential portions, open towards the axial end face of the bush, of the axial defining wall of the circumferential groove. As a result of the lower number of movable parts, small diameter collapsible cores may also be mechanically robust and thus inexpensive to manufacture and exhibit low susceptibility to failure in operation.

To be able to hold the retaining unit securely in the receiving groove, the retaining unit may comprise a plurality of spring elements projecting radially inwards relative to the longitudinal axis from a base element of the retaining unit. The spring elements are intended to exert a radially outwardly directed force onto the base element after insertion of the connecting piece into the receiving space in cooperation with the outer circumferential surface of the connecting piece, which force pushes the base element into the circumferential groove. Preferably the plurality of spring elements is distributed uniformly over the circumference of the base element.

To be able to insert the retaining unit simply into the circumferential groove, it is proposed to configure the base element in the form of a split ring. By closing the slot in the split ring the circumference of the base element and thus its diameter may be reduced such that it may be introduced straightforwardly into the circumferential groove.

In a further development it is proposed that the spring elements are configured as barb elements and comprise the further bearing surface of the retaining unit directed opposite to the opening direction. More precisely, all the end faces together of the spring elements directed opposite to the opening direction form the further bearing surface of the retaining unit. In addition, the bearing surface of the retaining unit directed in the opening direction of the receiving space may be formed on the base element of said unit, and the associated mating bearing surface may be formed by a defining face of the circumferential groove of the bush.

In this context, a further function may be performed by the split construction of the base element, specifically securing of the base element against unintentional turning in the circumferential direction about the longitudinal axis. If the base element could turn in any desired way in the circumferential groove, at least one of the barb elements could find itself in a circumferential portion in which the axial defining wall of the circumferential groove is open towards the axial end face of the bush. In this case, it might be impossible for extraction forces acting on the connecting piece to be introduced in a substantially linear flow from the connecting piece into the barb elements and thence via the base element on into the defining wall of the bush, but rather they would have to take a "detour" in the base element in the circumferential direction. This would weaken force transfer overall, since in this way the base element would not only be pressure-loaded, but also shear-loaded.

Antitwist protection may for example be achieved by a projection which projects radially inwards from the base of the circumferential groove at a predetermined circumferential position. Through engagement of the free ends of the split base element with this projection, the base element may be kept in a desired position relative to the bush within predetermined tolerance limits, which are determined by the dimensions of the slot of the split element and the dimensions of the projection in the circumferential direction. This desired relative position is preferably selected such that each of the barb elements is associated with one wall portion of the axial defining wall of the circumferential groove.

The antitwist projection may be simply configured at a circumferential position at which, relative to the collapsible core, an intermediate segment of the collapsible core connected rigidly to the central body is arranged, i.e. at a circumferential position at which the axial defining wall of the circumferential groove would actually be open towards the axial end face of the bush. Said opening may however be closed or at least partially closed by the antitwist projection. If a residual opening still remains in the circumferential direction on both sides of the antitwist projection, this acts as a visual indicator for the position of the antitwist projection, which simplifies insertion of the retaining unit.

A further development of the invention additionally proposes making the retaining unit of a more flexible material than the bush, preferably of a more flexible plastics material than the bush.

According to a further, independent variant of the invention, the object according to the invention is additionally achieved by a joint unit of the above-mentioned type in which at least one fastening element provided for axial fastening of the bush to the main body is configured as a locking element with a spring web connected to the bush and extending thence axially opposite to the opening direction of the receiving space and a locking lug projecting radially inwards from the free end of the spring web, which locking lug is intended for engagement in a locking recess formed in the main body. Advantageously, the bush may comprise a plurality of fastening elements, which preferably all take the form of locking elements.

As a result of this design, the mould cavities of the injection mould for forming the locking elements are formed of two moulding elements, which only need to be moved in the axial direction to open and close the mould. This simplifies production irrespective of the configuration of the joint unit discussed above. However, the above-discussed configuration of the joint unit is also associated with production advantages. Specifically, the central body of the collapsible core has merely to be configured at its free end with cylindrical portions of appropriately stepped diameter to form the circumferential groove, while the actual mould cavities for forming the locking elements are provided on a second mould body, which is brought from the opposite side into engagement with the free end of the collapsible core.

To simplify production further or to simplify further the design of the injection moulding tool, provision may be made for the locking element to be provided adjacent the end of the bush remote from the opening of the receiving space.

In order, despite the inventive configuration, to be able to protect the locking elements from damage during insertion of the connecting piece, it is proposed that a radially inwardly projecting annular rib of the bush, from which the spring web of the locking element extends, serve at the same time as an insertion limiting stop face for the connecting piece.

In a further development of the two variants of the invention, the main body may comprise at least one circumferential groove for receiving a sealing element, for example an O-ring, radially opposite the circumferential groove of the bush when main body and bush are in the assembled state.

In addition, the main body may comprise a radially outwardly projecting annular rib at its outer circumferential surface, which rib serves as a stop for the retaining unit, limiting slip-on thereof onto the main body.

In order to be able to prevent undesired manipulation of the at least one retaining element from outside, the bush may comprise an outer circumferential surface closed over its entire circumference.

It should also be added that the main body may be made from plastics, for example from polyamide, in particular as an injection moulding. However, it may also be made of metal, for example of brass. The bush with the retaining unit formed in one piece thereon may preferably be made of plastics, in particular as an injection moulding.

As mentioned above, the invention finally also relates to a joint assembly, comprising a joint unit according to the invention and a connecting piece with an annular flange, which may be brought into retaining engagement with the retaining unit.

The invention is explained in greater detail below by means of an exemplary embodiment and with reference to the appended drawings, in which.

Figure 1:
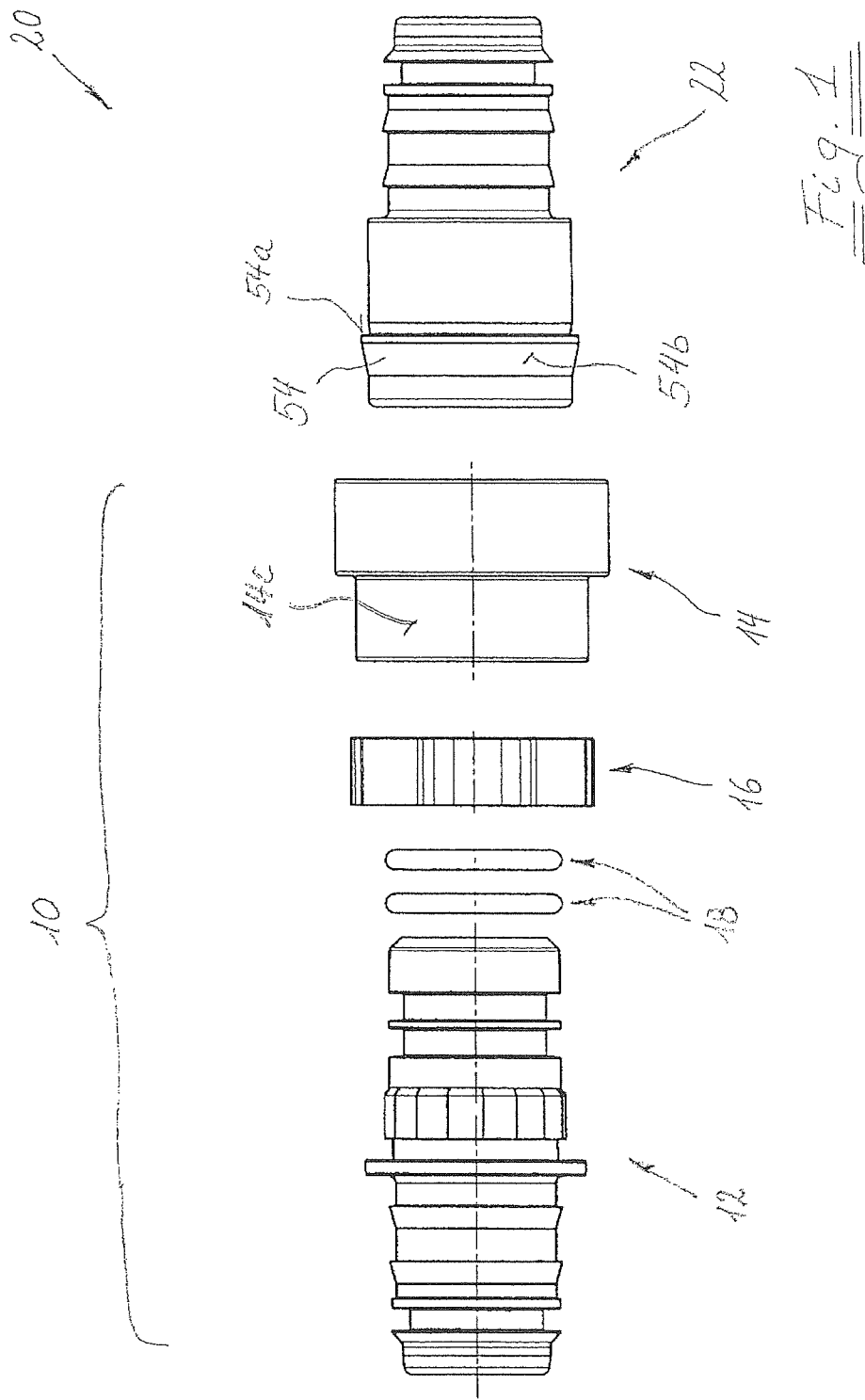
FIG. 1 is an exploded representation of the individual components of a joint unit or joint assembly according to the invention.

In FIG. 1 a joint unit according to the invention is designated in general as 10. It comprises a main body 12, a bush 14, a retaining unit 16 and two sealing elements 18 in the form of O-rings. The joint unit 10 is configured and intended for sealing connection with a connecting piece 22, together with which it forms a joint assembly 20.

Figure 2:
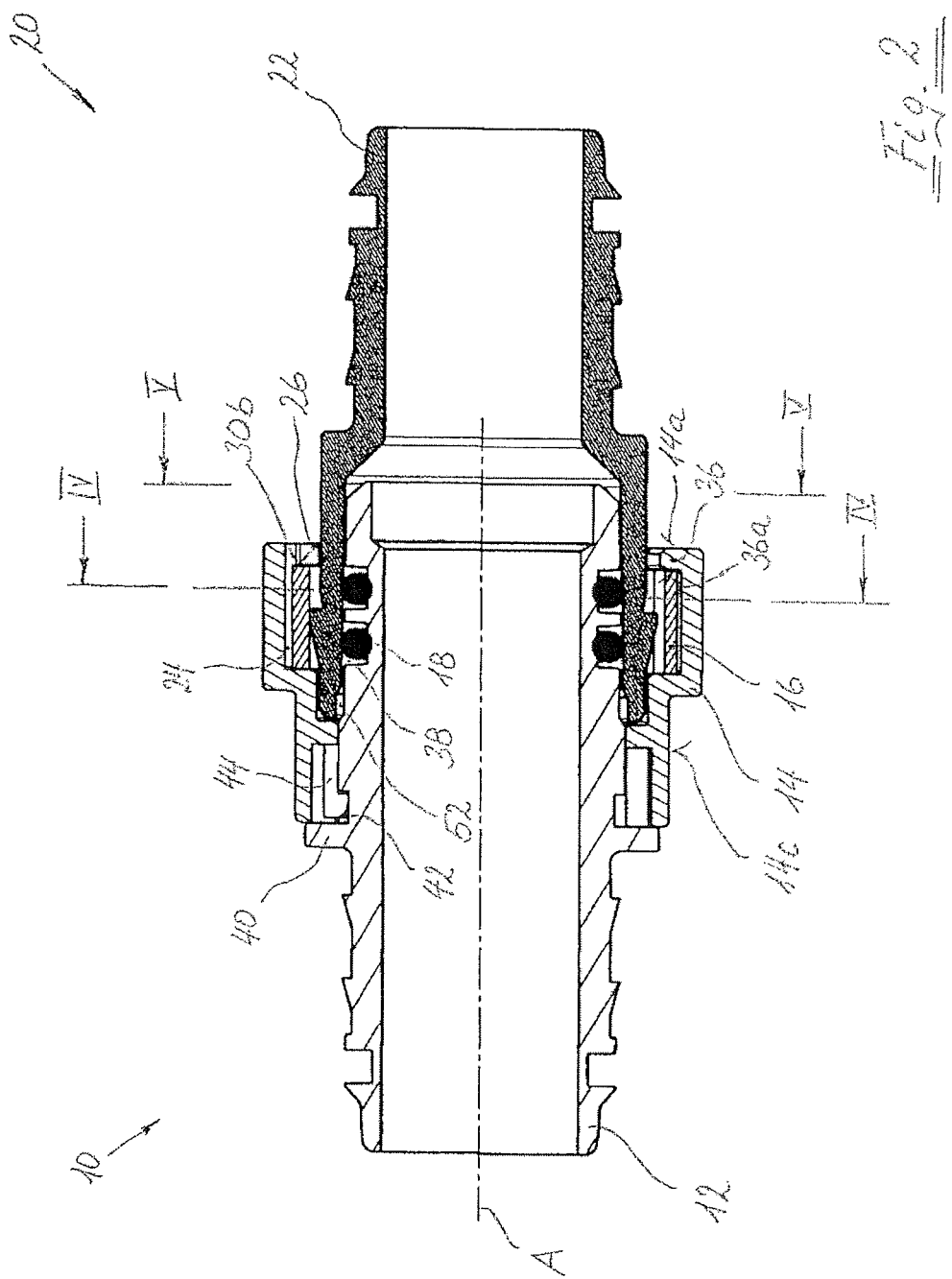
FIG. 2 shows a longitudinal section of the joint unit or joint assembly according to FIG. 1, the joint assembly being in the assembled state.
Figure 3:
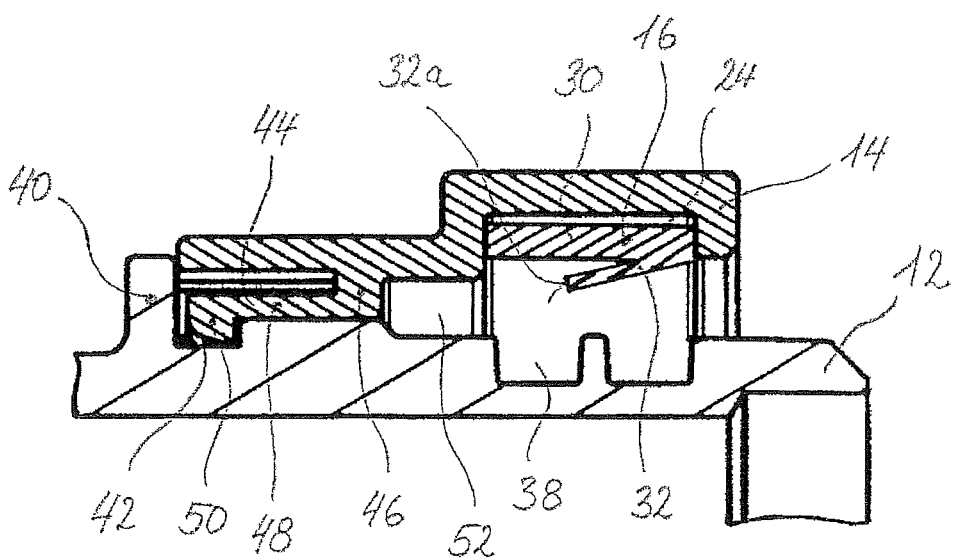
FIG. 3 shows an enlarged detail of the illustration according to FIG. 2, but taken along line III-III in FIG. 4.
Figure 5:
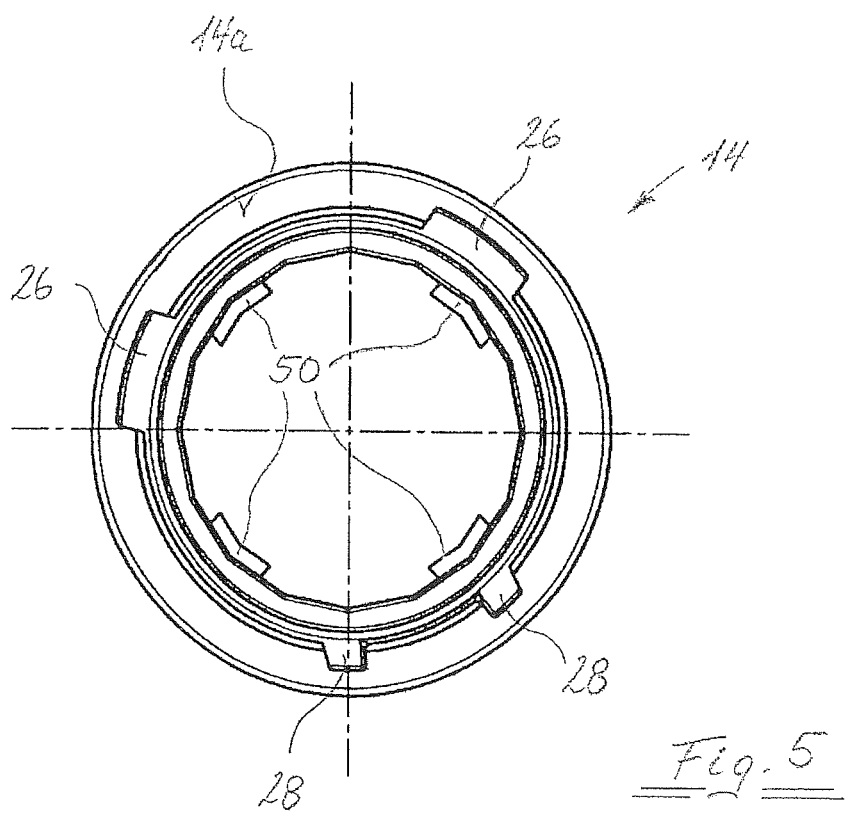
FIG. 5 is an end-on view of the bush alone taken along line V-V in FIG. 2.

As shown in FIGS. 2 and 3, the retaining unit 16 is accommodated in a circumferential groove 24 of the bush 14 when the joint unit 10 is in the assembled state. The circumferential groove 24 is open in a radially inward direction for insertion of the retaining unit 16. In addition, it comprises circumferential portions 26 and 28 open towards the axial end face 14a of the bush 14 (see also FIG. 5). These open circumferential portions 26, 28 are related to manufacture, an aspect which will be examined in greater detail below with reference to FIG. 6.

Figure 4:
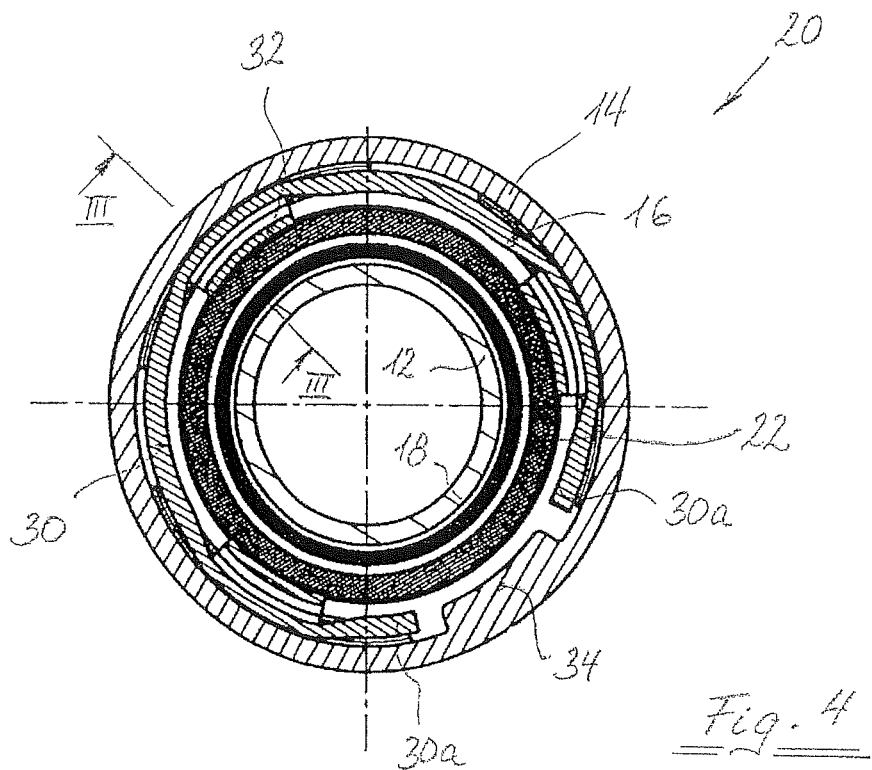
FIG. 4 shows a sectional view taken along line IV-IV in FIG. 2 of the joint assembly according to FIG. 2.

As is clear from FIG. 4, the retaining unit 16 takes the form of a split ring. More precisely, the retaining unit 16 comprises a base element 30 in the form of a split ring, from which three spring elements 32 project in a radially inward direction (see also FIG. 3). The spring elements 32 here take the form of barb elements, which are connected with their one end in one piece with the base element 30 and exhibit a greater radial distance from the base element 30 as the longitudinal distance between its end connected to the base element 30 and its free end increases.

It should be noted at this point that the free ends 30a of the base element 30 circumferentially face a projection 34 projecting radially inwards from the bush 14. Interaction of the free ends 30a of the base element 30 with this projection 34 provides antitwist protection for the retaining unit 16. This antitwist protection ensures that within certain tolerance limits the barb elements 32 are always at predetermined circumferential positions around the longitudinal axis A of the joint unit 10 or the joint assembly 20.

As a consequence of the split construction of the retaining unit 16, the external diameter of the base element 30 can be reduced to such an extent by simple compression, moving the two free ends 30a thereof towards one another, that the base element 30 may be inserted into the bush 14 past the axial defining wall 36 of the circumferential groove 24 of the bush 14 until it is located at a longitudinal position corresponding to the circumferential groove 24. In this position the base element 30 of the retaining unit 16 can flare out again due to the inherent elasticity of the material thereof and thus be inserted into the circumferential groove 24, as shown in FIGS. 2 to 4.

To assemble the joint unit 10, the assembly consisting of bush 14 and retaining unit 16 thus preassembled is slid onto the main body 12, after the two sealing elements 18 have previously been inserted into receiving grooves 38 provided therefor in the main body 12. Sliding of the bush 14 (including the retaining unit 16) onto the main body 12 is limited by an annular nose 40 projecting radially from the base member 12, which annular nose 40 is approached by the leading end 14b of the bush 14. On the side on which the bush 14 adjoins the annular nose 40, the main body 12 has a circumferential groove 42 intended to interact with locking hooks 44 of the bush 14. Through interaction of the locking hooks 44 with the circumferential groove 42, the bush 14 is fixed non-detachably to the main body 12.

At this point it should be pointed out that the term "non-detachably" should be understood in the context of the present invention to mean that the bush 14 can only be removed again from the main body 12 by damaging the components of the joint unit 10. As a result of this damage, any improper manipulation of the joint unit 10 or the joint assembly 20 can be readily detected. The bush 14 can no longer be removed from the main body 12 without damage.

As FIG. 3 reveals, the bush 14 comprises a radially inwardly projecting annular rib 46, from which radially inner spring webs 48 of the locking elements 44 extend in the axial direction. At the free ends of the spring webs 48 there are located radially inwardly directed locking lugs 50, which engage in the circumferential groove 42.

Once the bush 14 has been slid fully onto the main body 12, with the locking elements 44 engaged in the circumferential groove 42 of the main body 12, the bush 14 and the main body 12 define between them a receiving space 52, which is open towards the end face 14a of the bush 14, i.e. to the right in FIG. 2. This receiving space 52 serves for insertion of the connecting piece 22, to bring about the assembled state, shown in FIG. 2, of the joint assembly 20.

At its outer circumferential surface the connecting piece 22 comprises an annular rib 54 (see FIG. 1), whose axial end face 54a is intended to interact with axial end faces 32a at the free ends of the barb elements 32 of the retaining unit 16. The end faces 32a of the free ends of the barb elements 32 together form the further bearing surface for the purposes of the present invention, while the axial end face 54a of the annular rib 54 of the connecting piece 22 forms the further mating bearing surface for the purposes of the present invention.

It should also be added that the annular rib 54 of the connecting piece 22 widens conically away from the joint unit 10 and thus forms a guide surface 54b, which deflects the barb elements 32 radially outwards during insertion of the connecting piece 22 into the receiving space 52, until the annular rib 54 has moved past the barb elements 32, such that the barb elements 32 can spring back radially inwards due to the inherent resilience of the material thereof. In this fully assembled state of the joint assembly 20, the axial end faces 54a and 32a face one another.

At this point it should additionally be pointed out that in this position the barb elements 32 rest against the outer circumferential surface of the connecting piece 22, and their inherent resilience thus produces a radially outwardly directed force on the base element 30, which secures the base element 30 in the circumferential groove 24.

It should additionally be pointed out that the annular rib 46 forms a stop for the connecting piece 22 which limits insertion of the connecting piece 20 into the receiving space 52.

Should it be attempted, from this assembled position of the connecting assembly 20, to pull the connecting piece 22 back out of the receiving space 52 (to the right in FIG. 2), first of all the axial bearing surfaces 54a and 32a come into contact with one another, such that the retaining unit 16 is driven to the right by the connecting piece 22 in FIG. 2 until the axial end face 30b of the base element 30 of the retaining unit 16 rests against an axial end face 36a of the axial defining wall 36 of the circumferential groove 24. The axial end face 30b here forms the bearing surface on the retaining unit 16 for the purposes of the invention, while the axial end face 36a forms the mating bearing surface on the bush 14.

According to the above, connection of the connecting piece 22 with the bush 14 through the intermediary of the retaining unit 16 can also only be undone again with damage to said components. This connection too is thus a non-detachable connection for the purposes of the present invention. Said non-detachability also means structurally that the outer circumferential surface 14c of the bush 14 is of closed configuration over its entire circumference. This measure prevents the possibility of acting from outside on the retaining unit 16 with any type of tool in order to undo engagement thereof with the bush 14 and/or the connecting piece 22.

The above-described antitwist projection 34 ensures that the barb elements 32 are located at circumferential positions at which the circumferential groove 24 does not comprise any of the axially open circumferential portions 26, 28. This measure means that any extraction force which is exerted on the connecting piece 22 is introduced thereby in substantially linear flow from the barb elements 32 to the base element 30 of the retaining unit 16 and thence on into the axial defining wall 36 of the circumferential groove 24 of the bush 14. This in particular prevents damage to the retaining unit 16 and in particular to the base element 30 thereof.

It should also be added that, in the light of the resilience required thereby, the retaining unit 16 is made of a more flexible material, in particular a more flexible plastics material, than the bush 14.

Figure 6:
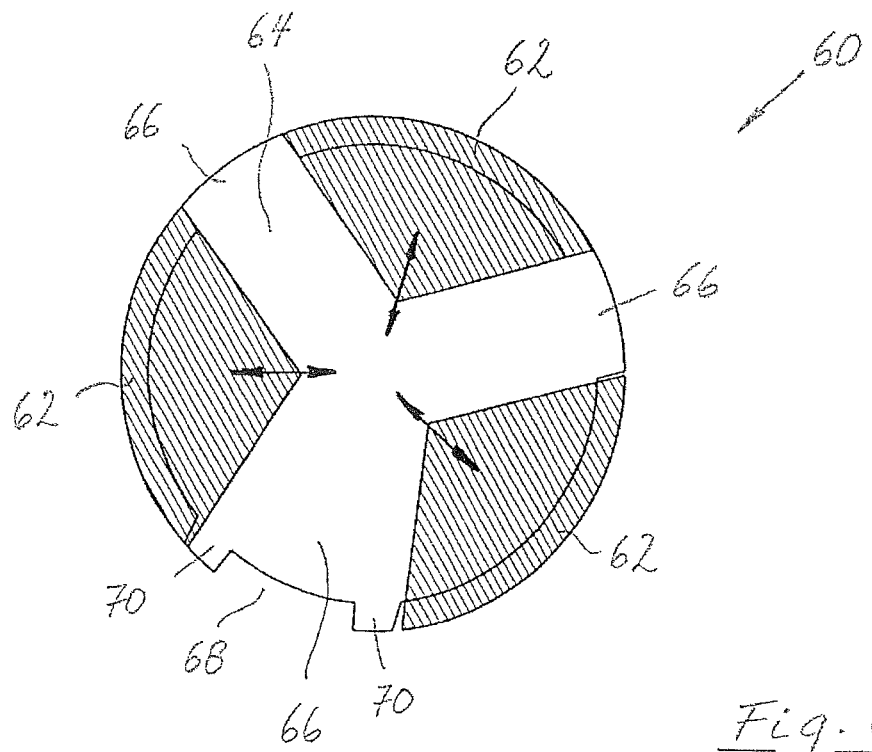
FIG. 6 is an end-on view of a collapsible core, as used in injection moulding the bush according to FIG. 5.

A more detailed explanation of the production of the bush 14, and in particular the production of the circumferential groove 24 thereof, will now be given with reference to FIG. 6. FIG. 6 shows a collapsible core 60 which, unlike the conventional construction of collapsible cores with three main segments and three intermediate segments, all of which are mounted displaceably on a central body, as known from DE 10 2007 039 368 A1, has just three main segments 62, which are mounted displaceably on a central body 64 of the collapsible core 60. The intermediate segments 66 are constructed in one piece with the central body 64 and are thus non-displaceable relative thereto. As a result of the rigid connection of the intermediate segments 66 with the central body 64 of the collapsible core 60, the collapsible core 60 can only be used to form circumferential grooves which are axially open at predetermined circumferential positions corresponding to the positions of the intermediate segments 66. Use of the collapsible core 60 according to FIG. 6 thus determines the presence of the above-mentioned windows 26, 28. However, the collapsible core 60 is of structurally considerably simpler construction than the collapsible core known from DE 10 2007 039 368 A1. This makes it possible also to use the collapsible core 60 to produce circumferential grooves 24, the diameter of which at the base is less than 15 mm, for example 12 mm.

FIG. 6 additionally shows that one of the intermediate segments 66 has a recess 68. This serves to form the antitwist projection 34. On the intermediate segment 66 the two projections 70 which define said recess 68 form the windows 28, such that the circumferential position of the antitwist protrusion 34 may be simply detected through the position of the windows 28. This facilitates insertion of the retaining unit 16 into the circumferential groove 24.

The invention claimed is:

1. A joint unit, comprising:
   a main body;
   a bush, which, in an assembled state of the joint unit is fastened to the main body in the direction of a longitudinal axis of the joint unit and forms with the main body a receiving space open towards a free end of the bush, the receiving space being configured for receiving an external connecting piece not forming part of the joint unit, the bush having an inner circumferential surface and an outer circumferential surface, the bush including a circumferential groove formed in the inner circumferential surface, the circumferential groove being open radially inwards relative to the longitudinal axis, the circumferential groove further being open towards an axial end surface of the bush in at least two circumferential portions of the circumferential groove, an entirety of the outer circumferential surface having a closed configuration; and
   a retaining unit that is formed separately from the bush, and which, in the assembled state of the joint unit is arranged in the circumferential groove in the bush, the retaining unit comprising:
      a first bearing surface directed in an opening direction of the receiving space, the first bearing surface being configured for interacting with a first mating bearing surface of the bush directed opposite to the opening direction of the receiving space, and
      a second bearing surface directed opposite to the opening direction of the receiving space, the second bearing being configured for interacting with a second mating bearing surface of the external connecting piece directed in the opening direction of the receiving space.

2. The joint unit according to claim 1, wherein the retaining unit comprises a base element configured to be arranged in the circumferential groove and a plurality of spring elements projecting radially inwards relative to the longitudinal axis from the base element of the retaining unit arranged in the circumferential groove.

3. The joint unit according to claim 2, wherein the base element is a split ring.

4. The joint unit according to claim 2, wherein the plurality of spring elements are configured as a plurality of barb elements and comprise the second bearing surface of the retaining unit directed opposite to the opening direction.

5. The joint unit according to claim 2, wherein the first bearing surface of the retaining unit directed in the opening direction of the receiving space is formed on the base element of the retaining unit, and the associated first mating bearing surface is formed by a defining face of the circumferential groove of the bush.

6. The joint unit according to claim 1, wherein the bush further comprises an antitwist projection that projects radially inwards from the base of the circumferential groove, the antitwist projection being provided at a predetermined circumferential position of the circumferential groove.

7. The joint unit according to claim 1, wherein the retaining unit is made from a material more flexible than the bush.

8. The joint unit according to claim 7, wherein the material comprises a plastic material.

9. The joint unit according to claim 1, wherein the bush further comprises at least one fastening element configured for fastening the bush to the main body, the fastening element including a locking element with a spring web extending axially opposite to the opening direction of the receiving space and a locking lug located at a free end of the spring web, the locking lug projecting radially inwards and configured to engage a locking recess formed in the main body.

10. The joint unit according to claim 1, wherein the main body comprises at least one circumferential groove for receiving a sealing element, the circumferential groove of the main body being located radially opposite the circumferential groove of the bush in the assembled state of the joint unit.

11. The joint unit according to claim 1, wherein the main body comprises an outer circumferential surface having a radially outwardly projecting annular rib, the rib forming a stop configured for engaging the retaining unit and limiting movement of the retaining unit in an axial direction of the main body.

12. The joint unit according to claim 1, wherein the bush further comprises at least one guide for arranging the retaining unit in the circumferential groove formed in the inner circumferential surface of the bush, the at least one guide being defined by at least one axial groove formed in the inner circumferential surface by the at least two portions of the circumferential groove open towards the axial end surface of the retaining unit.

13. A joint unit, comprising:
   a main body;
   a bush, which, in an assembled state of the joint unit is fastened to the main body in the direction of a longitudinal axis of the joint unit and forms with the main body a receiving space open towards a free end of the bush the receiving space being configured for receiving an external connecting piece not forming part of the joint unit, the bush comprising at least one fastening element configured for fastening the bush to the main body in an axial direction of the joint unit, the at least one fastening element including a locking element with a spring web extending axially opposite to an opening direction of the receiving space and a locking lug located at a free end of the spring web, the locking lug projecting radially inward and configured for engaging a locking recess formed in the main body, the bush having an inner circumferential surface and an outer circumferential surface, the bush including a circumferential groove formed in the inner circumferential surface, the circumferential groove being open radially inwards relative to the longitudinal axis, the circumferential groove further being open towards an axial end surface of the bush in at least two circumferential portions of the circumferential groove, an entirety of the outer circumferential surface having a closed configuration; and a retaining unit that is formed separately from the bush, and which, in the assembled state of the joint unit is arranged in the circumferential groove in the bush, the retaining unit comprising:

a first bearing surface directed in the opening direction of the receiving space, the first bearing surface being configured for interacting with a first mating bearing surface of the bush directed opposite to the opening direction of the receiving space, and a second bearing surface directed opposite to the opening direction of the receiving space, the second bearing surface being configured for interacting with a second mating bearing surface of the external connecting piece directed in the opening direction of the receiving space.

14. The joint unit according to claim 13, wherein the locking element is provided adjacent the end of the bush remote from the opening of the receiving space.

15. The joint unit according to claim 13, the bush further comprising a radially inwardly projecting annular rib, the spring web of the locking element extending from the annual rib, the annular rib forming a stop configured for limiting insertion of the external connecting piece into the receiving space.

16. The joint unit according to claim 13, wherein the bush comprises a plurality of fastening elements.

17. The joint unit according to claim 16, wherein the plurality of fastening elements are locking elements.

18. A joint assembly, comprising:
a connecting piece, the connecting piece having an annular flange; and
a joint unit, the joint unit comprising:
a main body;
a bush, the bush being fastened to the main body in the direction of a longitudinal axis of the joint unit and forming with the main body a receiving space open towards a free end of the bush, the receiving space having a configuration that receives the connecting piece, the bush having an inner circumferential surface and an outer circumferential surface, the bush having a circumferential groove formed in the inner circumferential surface, the circumferential groove being open radially inwards relative to the longitudinal axis, the circumferential groove further being open towards an axial end surface of the bush in at least two circumferential portions of the circumferential groove, an entirety of the outer circumferential surface having a closed configuration; and
a retaining unit formed separately from the bush, the retaining unit being arranged in the circumferential groove in the bush, the retaining unit comprising:
a first bearing surface directed in an opening direction of the receiving space, the first bearing surface engaging a first mating bearing surface of the bush directed opposite to the opening direction of the receiving space, and
a second bearing surface directed opposite to the opening direction of the receiving space, the second bearing surface engaging a second mating bearing surface of the connecting piece directed in the opening direction of the receiving space, the second mating bearing surface being the annular flange of the connecting piece.

* * * * *

UNITED STATES PATENT AND TRADEMARK OFFICE
CERTIFICATE OF CORRECTION

PATENT NO. : 8,979,134 B2
APPLICATION NO. : 13/719834
DATED : March 17, 2015
INVENTOR(S) : Sören Schröter et al.

It is certified that error appears in the above-identified patent and that said Letters Patent is hereby corrected as shown below:

On the Title Page, item (73) Assignee:

"Frankische" should read --Fränkische--

"Konigsberg" should read --Königsberg--

On the Title Page, item (30) Foreign Application Priority Data:

"10 2011 089 100" should read --10 2011 089 100.5--

Signed and Sealed this
Thirteenth Day of October, 2015

Michelle K. Lee
*Director of the United States Patent and Trademark Office*